United States Patent [19]
White

[11] Patent Number: 5,078,534
[45] Date of Patent: Jan. 7, 1992

[54] FLUSH NUT CONNECTORS

[75] Inventor: Donald L. White, Kent, Ohio

[73] Assignee: Samson Truss Corporation, Kent, Ohio

[21] Appl. No.: 630,249

[22] Filed: Dec. 19, 1990

[51] Int. Cl.$^5$ .............................................. F16B 7/00
[52] U.S. Cl. .................... 403/292; 403/306; 403/379
[58] Field of Search ............... 403/292, 306, 109, 354, 403/378, 379; 411/166–167, 338–339, 427

[56] References Cited

U.S. PATENT DOCUMENTS

| | | | |
|---|---|---|---|
| 501,918 | 6/1893 | Caldwell | 403/298 |
| 1,151,810 | 8/1915 | Moore | 403/373 X |
| 1,420,670 | 6/1922 | Schuette | 403/292 |
| 2,539,229 | 1/1951 | Colburn | 403/292 X |
| 2,652,674 | 9/1953 | Lee | 403/292 X |
| 2,759,239 | 8/1956 | Snyder | 403/292 X |
| 2,878,059 | 3/1959 | Limle | 403/292 X |
| 3,289,296 | 12/1966 | Hedstrom | 403/161 |
| 3,339,953 | 9/1967 | Bohn | 403/387 |
| 3,462,114 | 8/1969 | O'Dell, Sr. et al. | 411/338 X |
| 3,552,056 | 1/1971 | Meates | 403/292 X |
| 3,946,916 | 3/1976 | Lawrence | 403/292 X |
| 4,253,509 | 3/1981 | Collet | 411/214 |
| 4,557,467 | 12/1985 | Lin | 403/292 X |
| 4,740,124 | 4/1988 | Pearson | 411/88 |
| 4,949,525 | 8/1990 | Weaver | 403/292 X |

FOREIGN PATENT DOCUMENTS

| | | | |
|---|---|---|---|
| 2255407 | 5/1974 | Fed. Rep. of Germany | 403/292 |
| 386509 | 1/1933 | United Kingdom | 403/292 |
| 576547 | 4/1946 | United Kingdom | 403/292 |

Primary Examiner—Andrew V. Kundrat

[57] ABSTRACT

A connection system is disclosed for securing tubular truss members together in a manner that keeps the attachment connectors internal and out of sight. The connection comprises tubular truss members with diametric opposite countersunk holes sized to accept flush nut inserts, screws, and a core connector that is sized to be intermediate to the tubular truss members. The core connector provides anti-rotation of flush nut inserts, while screws and flush nuts are tightened to secure connection.

2 Claims, 4 Drawing Sheets

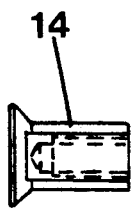
FIG.3
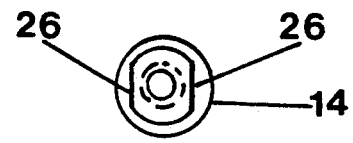
FIG.3A
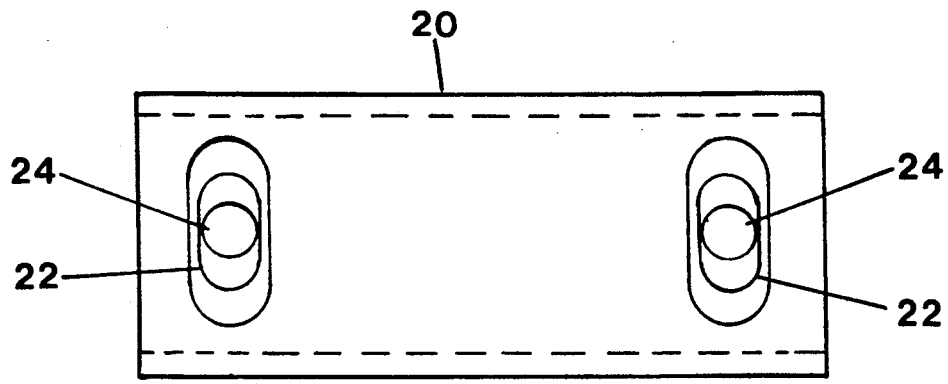
FIG.4
FIG.4A
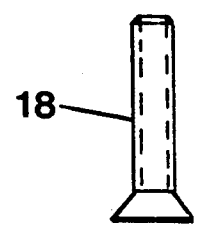
FIG.5

FLUSH NUT CONNECTORS

BACKGROUND

This invention relates to connecting modular tubular truss.

The users of tubular metal truss needs are best satisfied by a connection system that is as strong as the truss itself, quick and easy to assemble and disassemble, and one that does not distract from the overall appearance of the truss structure. In the past no connection system marketed provided all of these preferred features. Most seem to focus on one of these requirements only, while others focus on a different need. This is a relatively new field where metal truss is no longer just structural but it is used for display and eye-catching design.

OBJECTS AND ADVANTAGES

Several objects and advantages of my invention are:
(a) to provide a connection that is not distracting from the aesthetics of the truss system, one that does not require enlargements of the structure at the connection area.
(b) to provide a connection that can be made as strong or stronger than the truss that it is connecting.
(c) to provide a connection that is easy and quick to assemble.
(d) to provide a connection that can be assembled with a commonly available, single tool.
(e) to provide a connection that can be tightened to secure with one hand only.
(f) to provide a connector that aids in assembling the truss pieces.
(g) to provide a connection that is economical to build and to use.
(h) to provide a hollow connection that doesn't add excessive weight.

The assignee of this invention, Samson Truss Corporation, is successfully marketing truss with flush nut connectors in square configuration (4 tubular members). Samson Truss Corporation also manufactures triangular configurations (3 tubular truss members). These configurations are also manufactured with different diameter tubular truss members. The only changes required to do this are that the outside diameter of core connector member must be sized to provide a sliding fit into tubular truss members. The securing screw length must also be properly sized for each diameter tubular truss member and its corresponding intermediate connector.

DESCRIPTION OF DRAWINGS

Further advantages of this invention will be found when considering the following description and drawings.

FIG. 3 is a side view of flush nut insert.

FIG. 3A is an end view of flush nut insert.

FIG. 4 is a plan view of tubular core connector showing slots and diametrically opposite holes.

FIG. 4A is a side view of tubular core connector showing slot shape and depth.

FIG. 5 is a side view of a standard flat head securing screw.

Figure 1:
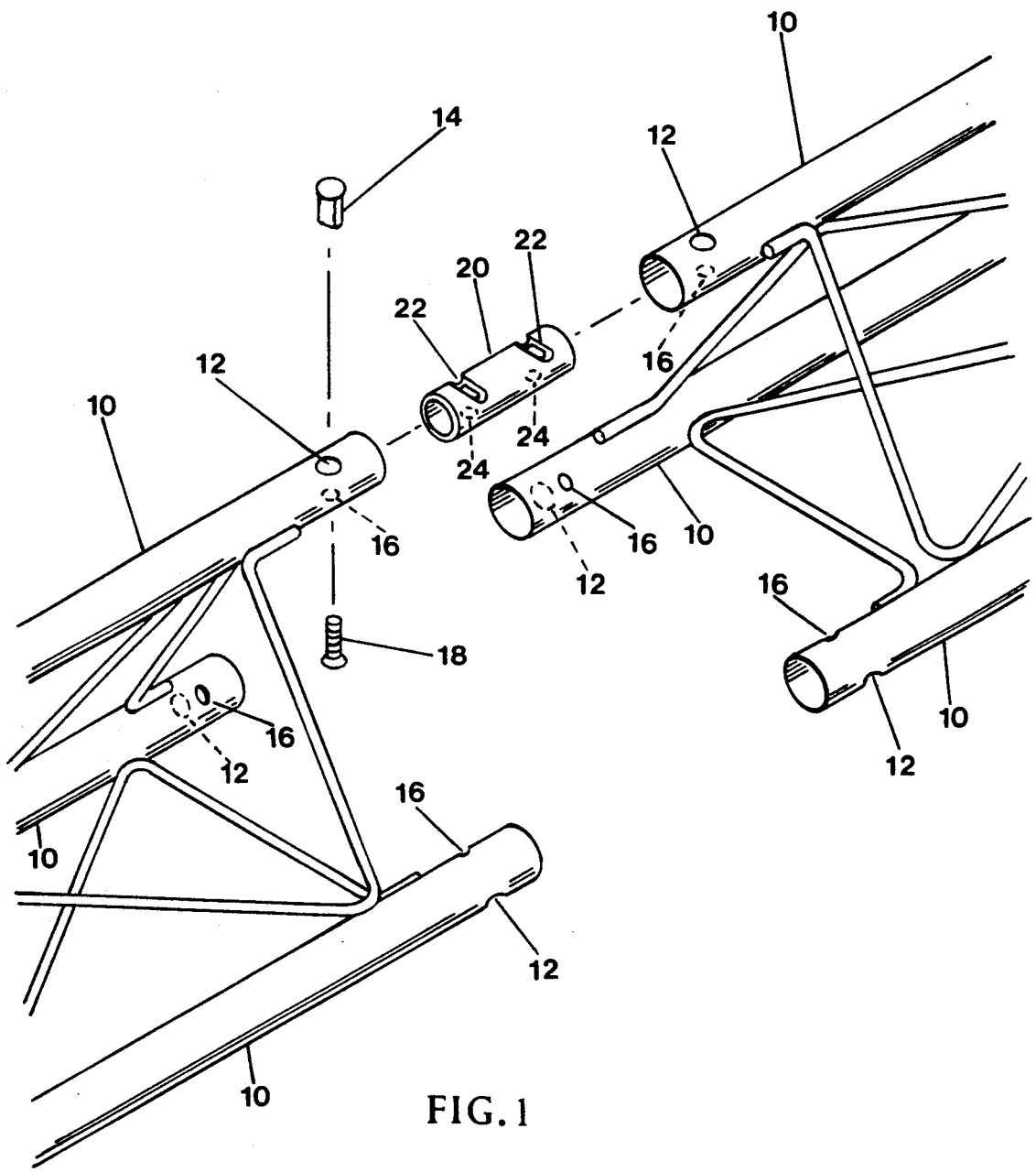
FIG. 1 is an exploded view of a triangular truss connection (3 tubular truss members).

Reference Numerals in Drawings 10-tubular truss member
12-countersunk hole on outside surface
14-flush nut insert
16-countersunk hole on inside surface
18-securing screw
20-tubular core connector
22-notch-shaped slots
24-clearance hole
26-flatted sides of flush nut insert

DESCRIPTION

Figure 2:
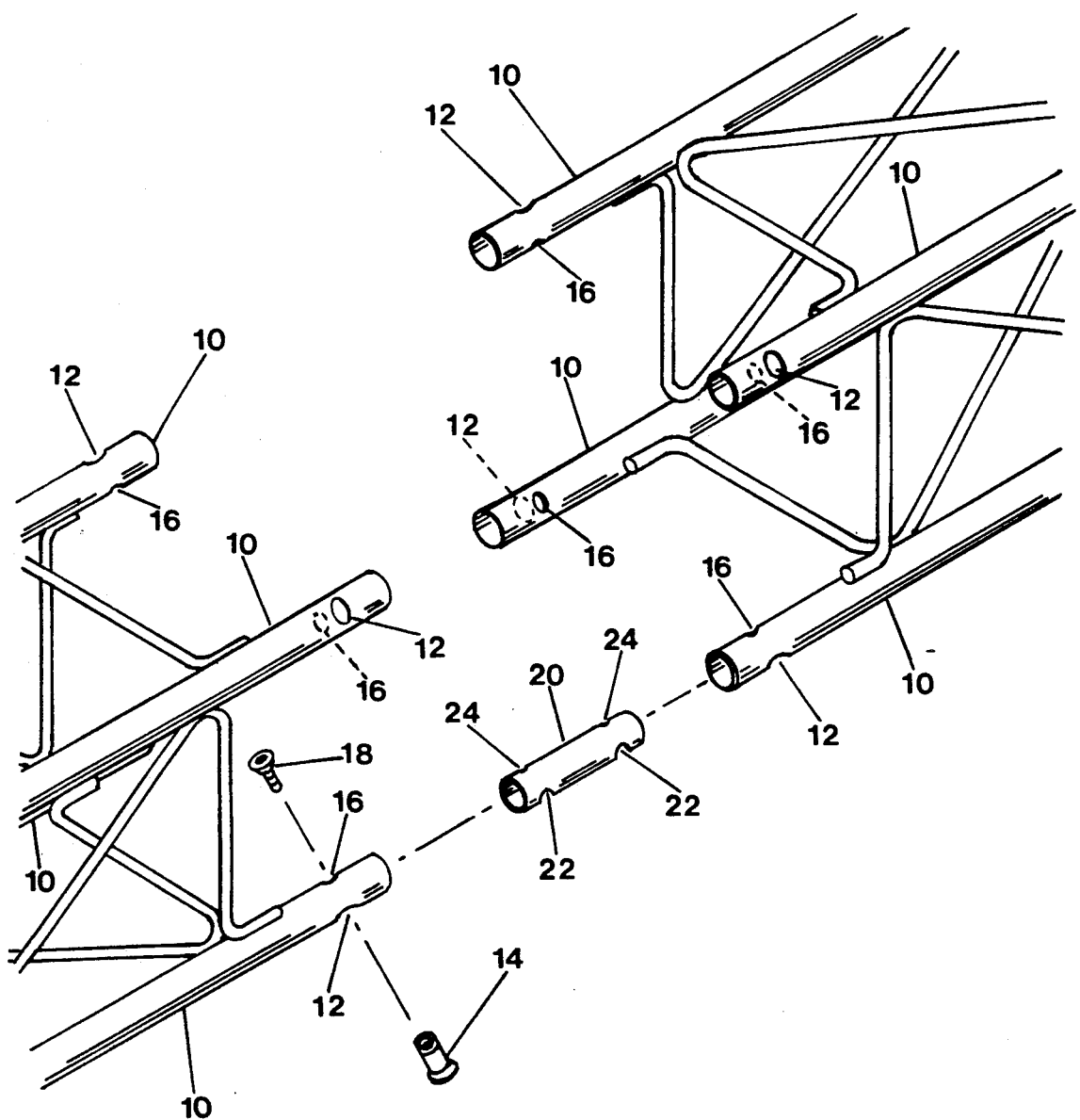
FIG. 2 is an exploded view of a square truss connection (4 tubular truss members).

Referring now in more detail to the drawing illustrating a preferred embodiment by which the invention may be realized, there is shown in FIGS. 1 and 2 exploded views of the two types of truss in which the new connecting system may be used. FIG. 1 shows triangular shaped truss having three tubular truss members 10 with diametrically opposite countersunk holes in each member. These holes are placed on the radial centerlines from the truss configuration center. Countersunk hole 12 on the outside surface of the tubular truss member 10 is sized to accept beveled head of the flush nut insert 14. The countersunk hole 16 on the inside surface of the tubular truss member 10 is sized to accept beveled head of the securing screw 18.

FIG. 2 shows square shaped truss having four tubular truss members 10 with diametrically opposite countersunk holes in each member. These holes are placed on the radial centerlines from the truss configuration center. Countersunk hole 12 on the outside surface of the tubular truss member 10 is sized to accept beveled head of the flush nut insert 14. The countersunk hole 16 on the inside surface of the tubular truss member 10 is sized to accept the beveled head of the securing screw 18.

The core connector 20 in FIGS. 1 and 2 is shown in more detail in FIGS. 4 and 4A. The flush nut insert 14 in FIGS. 1 and 2 is shown in more detail in FIGS. 3 and 3A. The securing screw 18 shown in FIGS. 1 and 2 is shown in more detail in FIG. 5.

OPERATION OR ASSEMBLY

Figures 6, 6A:
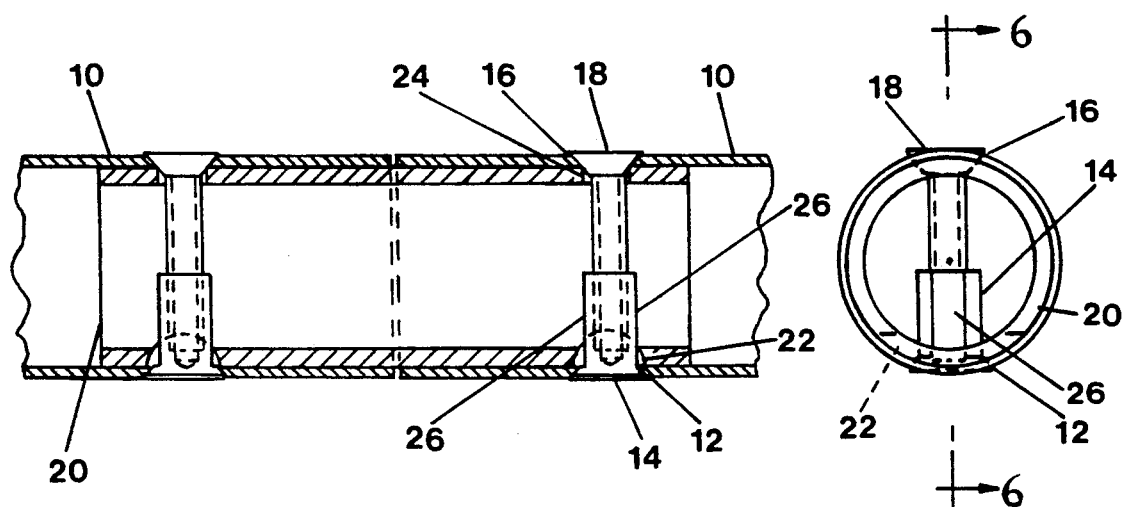
FIG. 6 is a longitudinal partial section of this invention as assembled.
FIG. 6A is an end view of this invention as assembled.

The operation or assembly can be described with reference to FIGS. 6 and 6A. These figures show a partial section side view and end view respectively of the fully assembled flush nut connector.

With reference to FIGS. 1 and 2 the core connector's 20 outside diameter is slightly less than the inside diameter of the tubular truss members 10. The core connector 20 when inserted into the tubular truss members 10 provides alignment and a structural bridge from one truss piece to the next.

The core connector's 20 notch-shaped slots 22 in FIGS. 1 and 2 are shown in more detail in FIGS. 4 and 4A. These slots provide a clearance but anti-rotation opening for flush nut insert 14 when assembled. Diametrically opposite these notchshaped slots 22 is a clearance hole 24 that encompasses securing screw 18 that aligns with tubular truss hole 16. This is shown in more detail in FIGS. 4 and 4A.

The flatted sides 26 of flush nut insert 14, shown in FIG. 3A allow assembly through notch-shaped slots 22 of core connector 20 but prevent rotation of flush nut insert 14 when installing securing screw 18. This anti-rotation feature provides the means to tighten the securing screw 18 with a single tool that drives the screw.

SUMMARY, RAMIFICATIONS, AND SCOPE

Accordingly, the reader will see that the flush nut connector does provide a connection where the attaching means is hidden and has the additional advantages in that:
- it provides a connection that is easy and quick to assemble and disassemble.
- it provides a connection that can be assembled with a single, common tool.
- it provides a connection that can be tightened with one hand operation.
- it provides a connection that is economical to build and use.
- it provides a connection that does not add excessive weight to the truss system.

Although the description above contains many specificities, these should not be construed as limiting the scope of the invention but merely providing illustrations of some of the preferred embodiments of this invention. For example, the flush nut insert and securing screw heads might have other shapes such as oval to match the truss tube member contour.

Thus the scope of the invention should be determined by the appended claims and their legal equivalents, rather than by the examples given.

We claim:

1. A device with internally hidden attachment system for connecting modular metal truss, said device including:

a tubular core connector and flush nut inserts. said tubular core connector joining two aligned tubular truss members together, said connector having two notch-shaped slots at right angle to the axis and having cylindrical holes diametrically opposite said slots, said slots and holes coincide with diametrically opposite countersunk holes of differing size in the two aligned tubular truss members, said flush nut insert having a cylindrical body with parallel flatted sides and a tapering transition to a cylindrical blank, smooth surfaced head, said cylindrical body having a centrally located, threaded hole that runs axially partially through the length of said insert for accepting a securing screw, said core connector becomes an intermediate bridge between two truss members and is secured by installing said flush nut inserts through outside surface of tubular truss member and through notch-shaped slots in said core connector, said slots prevent rotation at assembly, connection is secured with a securing screw that enters through aligned holes that are diametrically opposite said flush nut insert.

whereby when fully assembled and secured a strong, smooth appearing truss connection is accomplished while the nut appears to be a hole plug on the outboard side of the truss component, said connection can readily be taken apart and reassembled as needed.

2. A truss connection according to claim 1, in which said flush nut insert for accepting a securing screw has a dome shaped head to match contour of tubular truss member.

* * * * *